United States Patent [19]

Toyoda

[11] Patent Number: 5,448,886
[45] Date of Patent: Sep. 12, 1995

[54] CATALYST DETERIORATION-DETERMINING DEVICE FOR AN INTERNAL COMBUSTION ENGINE

[75] Inventor: Katsuhiko Toyoda, Shizuoka, Japan

[73] Assignee: Suzuki Motor Corporation, Shizuoka, Japan

[21] Appl. No.: 124,340

[22] Filed: Sep. 20, 1993

[30] Foreign Application Priority Data

Nov. 4, 1992 [JP] Japan .................. 4-319379

[51] Int. Cl.6 ............................. F01N 3/20
[52] U.S. Cl. ........................ 60/276; 60/277
[58] Field of Search ................... 60/276, 277

[56] References Cited

U.S. PATENT DOCUMENTS

| | | |
|---|---|---|
| 4,693,076 | 9/1987 | Chujo et al. . |
| 4,707,984 | 11/1987 | Katsuno et al. . |
| 4,720,973 | 1/1988 | Katsuno . |
| 4,831,838 | 5/1989 | Nagai . |
| 4,854,124 | 8/1989 | Tamura . |
| 4,977,881 | 12/1990 | Abe et al. . |
| 5,119,628 | 6/1992 | Uema .................. 60/277 |
| 5,154,054 | 10/1992 | Nakane et al. . |
| 5,154,055 | 10/1992 | Nakane et al. . |
| 5,157,921 | 10/1992 | Ito et al. . |
| 5,168,700 | 12/1992 | Furuya . |
| 5,168,701 | 12/1992 | Yamamoto . |
| 5,193,339 | 3/1993 | Furuya . |
| 5,220,788 | 6/1993 | Kurita . |
| 5,280,707 | 1/1994 | Nakashima .................. 60/276 |

FOREIGN PATENT DOCUMENTS

| | | |
|---|---|---|
| 0478133A2 | 4/1992 | European Pat. Off. . |
| 3-253714 | 11/1991 | Japan . |
| 4-008854 | 1/1992 | Japan . |
| 4-109045 | 4/1992 | Japan . |
| 4-116239 | 4/1992 | Japan . |

*Primary Examiner*—Douglas Hart
*Attorney, Agent, or Firm*—Flynn, Thiel, Boutell & Tanis

[57] ABSTRACT

A catalyst deterioration-determining device for an internal combustion engine having first and second exhaust sensors positioned in an exhaust path of the internal combustion engine upstream downstream, respectively, of a catalyzer located in the exhaust path. The internal combustion engine further including a control station for effecting feedback control to match an air-fuel ratio with a desired value in accordance with first and second detection signals from the first and second exhaust sensors, respectively. The catalyst deterioration-determining device including a determining section provided in the control station which obtains a deterioration-determined value from calculations based on a rich determination delay time, a lean determination delay time, a lean response delay time and a rich response delay time when a deteriorated state of the catalyzer is determined. The lean response delay time and the rich response delay time extend from the beginning of a decrease and an increase in the first feedback control-corrected quantity to a lean inversion time and a rich inversion time of the second detection signal in response to rich and lean inversions of the first detection signal. The rich determination delay time and the lean determination delay time extend from a rich inversion time and a lean inversion time of the first detection signal to the beginning of the decrease and increase in the feedback control-corrected quantity. The determining section performs calculations in accordance with the deterioration-determined value to determine the deteriorated state of the catalyzer.

2 Claims, 9 Drawing Sheets

FIRST O₂ SENSOR OUTPUT

SECOND O₂ SENSOR OUTPUT

SECOND O₂ SENSOR OUTPUT

FIG. 7
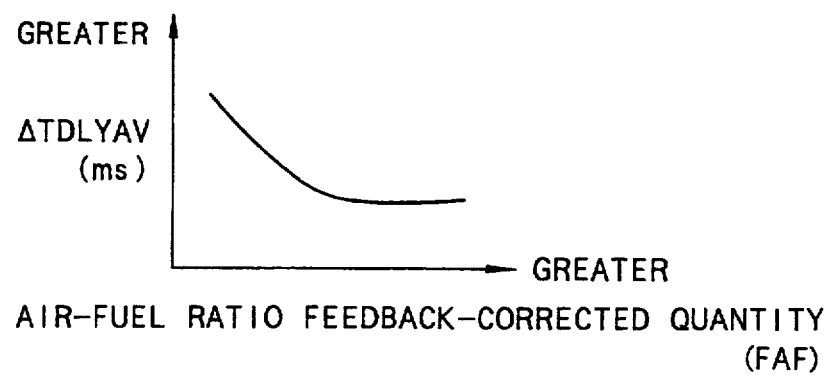
FIG. 8A
FIRST O₂ SENSOR OUTPUT
FIG. 8B
FIRST O₂ SENSOR FEEDBACK-CORRECTED QUANTITY (FAF)
FIG. 8C
SECOND O₂ SENSOR OUTPUT
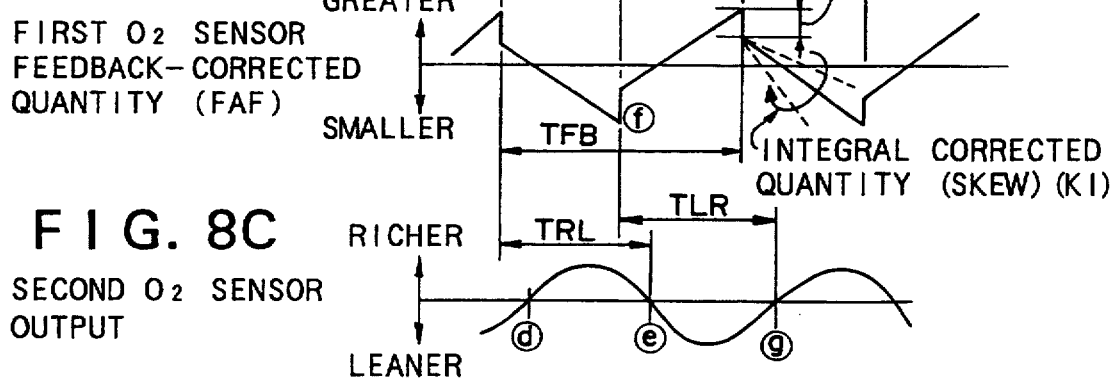

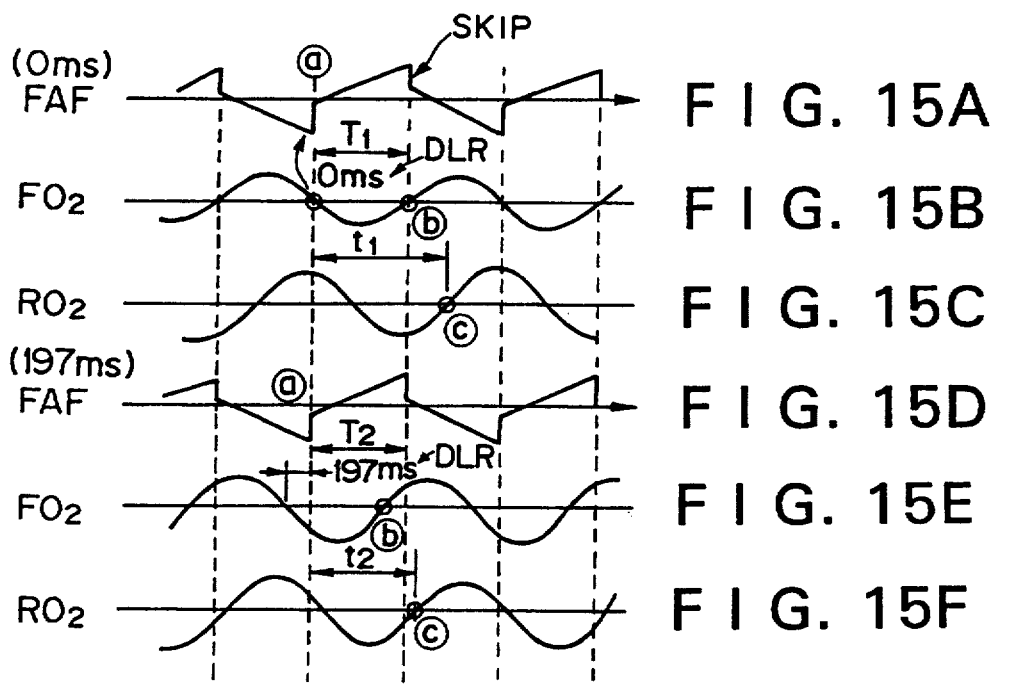
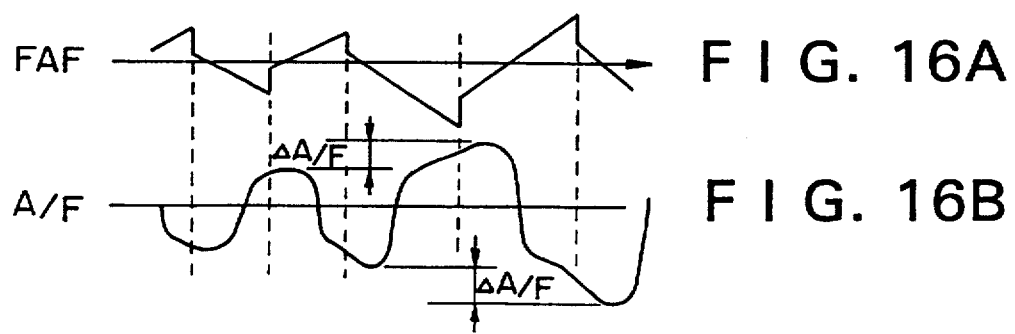

CATALYST DETERIORATION-DETERMINING DEVICE FOR AN INTERNAL COMBUSTION ENGINE

CROSS REFERENCE TO RELATED APPLICATION

Reference is made to Applicant's related co-pending patent application Ser. No. 08/102 090, filed Aug. 4, 1993, entitled "APPARATUS FOR JUDGING DETERIORATION OF CATALYST OF INTERNAL COMBUSTION ENGINE" which discusses the principals of determining catalyst deterioration in greater depth. The disclosure of this earlier filed copending application, in its entirety is incorporated herein by reference.

FIELD OF THE INVENTION

The present invention relates to a catalyst deterioration-determining device for use in an internal combustion engine. More particularly, it relates to a catalyst deterioration-determining device which can accurately determine the deterioration of a catalyzer resulting from manufacturing non-uniformities or deterioration during use.

BACKGROUND OF THE INVENTION

Internal combustion engines disposed in vehicles are typically provided with a catalyzer, first and second oxygen (herein $O_2$) sensors, and a control means. The catalyzer is located in an exhaust path of the internal combustion engine. The first and second $O_2$ sensors, which serve as exhaust sensors, are positioned in the exhaust path upstream and downstream of the catalyzer respectively. The control means provides feedback control such that an air-fuel ratio achieves a desired value in accordance with first and second detection signals which are respectively sent out from the first and second $O_2$ sensors. The internal combustion engine is thereby adapted to improve the exhaust cleanup efficiency of the catalyzer in order to reduce values of noxious exhaust components that are discharged from the internal combustion engine.

Japanese Patent Laid-Open Nos. 4-109045 and 4-116239 disclose such internal combustion engines designed for reducing the values of exhaust noxious components discharged therefrom.

The internal combustion engines disclosed in said U.S. Pat. No. 4,109,045 has first and second $O_2$ sensors disposed respectively upstream and downstream from an exhaust cleaning means positioned in the exhaust path of the internal combustion engine. Feedback control is performed in accordance with a first detection signal from the first $O_2$ sensor to match an air-fuel ratio with a desired value. When the desired value is changed, the above system is adapted to monitor the deterioration of the cleaning means in accordance with an ensuing response change in a second detection signal sent out from the second $O_2$ sensor.

The internal combustion engines disclosed in said U.S. Pat. No. 4,116,239 also has first and second $O_2$ sensors disposed respectively upstream and downstream from an exhaust cleaning means (i.e. catalyzer) positioned in the exhaust path of an internal combustion engine. Feedback control is also performed in accordance with a first detection signal from the first $O_2$ sensor to match an air-fuel ratio with its desired value. However, the internal combustion engine further includes a deterioration-determining means and a determination-inhibiting means. The deterioration-determining means determines the deterioration of the catalyzer by comparing the output of the first $O_2$ sensor with that of the second $O_2$ sensor while feedback control is effected. The determination-inhibiting means inhibits the deterioration-determining means from determining the deterioration of the catalyzer if the number of updates of a feedback control learning value is less than a predetermined number.

The cleaning function of a catalyzer located in an exhaust path of an internal combustion engine typically will not significantly decrease when the catalyzer is used in a normal operating state of the internal combustion engine. However, there are cases where the catalyzer experiences poisoning caused by lead, or failures due to crude gases and the like, such as when an internal combustion engine designed for receiving lead-free gasoline as fuel is supplied with lead-containing gasoline, or when the internal combustion engine operates with an improper or malfunctioning ignition plug. Such poisoning and failures in the catalyzer cause deterioration of the catalyzer and significantly degrades its cleaning function, thus reducing the exhaust gas cleanup efficiency of the catalyzer. As a result, the degraded catalyzer cannot prevent a large quantity of uncleaned exhaust from being discharged into the air, which results in environmental pollution.

Accordingly, it is desirable that the internal combustion engine precisely measure and determine with a high degree of accuracy a deteriorated state of the catalyzer. However, if the deteriorated state of the catalyzer is determined with a low degree of accuracy, a warning is typically issued that there are abnormalities in the catalyzer regardless of whether the catalyzer is or is not operating normally. This causes inconvenience and needless confusion, and reduces reliability.

Among the catalyst deterioration-determining devices for determining a deteriorated state of the catalyzer as described above, there is one type of device which obtains a deterioration-determined value from a calculation as described below and compares it with a deterioration-set value to determine the deteriorated state of the catalyzer. The deterioration-determined value is calculated on the basis of a lean response delay time and a rich response delay time, which times respectively elapse from the beginning of a decrease and an increase in a first feedback control-corrected quantity, to a lean inversion time and a rich inversion time of a second detection signal from the second $O_2$ sensor. The deterioration-determining value is calculated in response to rich and lean inversions of a first detection signal which is sent out from the first $O_2$ sensor. However, as described below, there is a problem with such a device in which a cleaning ratio of the catalyzer is simulated and determined on the basis of the lean response delay time and the rich response delay time of the second $O_2$ sensor.

As illustrated in FIGS. 15A–15F, one response delay time t1 (i.e., t1=TLR), and the other response delay time t2 (i.e., t2=TRL), of the second $O_2$ sensor are interrelated respectively with periods T1 and T2 of a first feedback control-corrected quantity FAF, through the first $O_2$ sensor. A first detection signal $FO_2$, from the first $O_2$ sensor provides a rich inversion (or a lean inversion) at the time of integration after every skip at which the first feedback control-corrected quantity FAF begins to decrease and increase. Thereafter, a second detection signal $RO_2$, from the second $O_2$ sensor provides a rich inversion (or a lean inversion).

A rich determination delay time DLR, elapses from a rich inversion time of the first detection signal $FO_2$ to the beginning of a decrease in the first feedback control-corrected quantity FAF. A lean determination delay time DRL, elapses from a lean inversion time of the first detection signal $FO_2$ to the beginning of an increase in the first feedback control-corrected quantity FAF. Next, as shown in FIGS. 15A–15F, comparison is made between the first detection signal $FO_2$ when DLR/DRL is assumed to be, for example, 0 ms and that when DLR/DRL is assumed to be 197 ms, with reference to the period of the single first feedback control-corrected quantity FAF. It is found that in the latter case, before the beginning of decreases and increases in the first feedback control-corrected quantity, the first detection signal $FO_2$ provides the rich inversions (or the lean inversions) earlier by 197 ms than the former case.

Accordingly, when the rich determination delay time DLR and the lean determination delay time DRL are 197 ms, the second $O_2$ sensor responds earlier (t1>t2). However, there is a problem in which a change in the determination delay time of the first $O_2$ sensor generates a variation in the response delay time of the second $O_2$ sensor. Further, as shown in FIGS. 16A and 16B, an air-fuel ratio at the beginning of a decrease and an increase in the corrected quantity through each skip varies with a change in the period of the first feedback control-corrected quantity FAF. Simultaneously, a catalyzer $O_2$ storage capacity at this time is changed as well. This produces a problem of being a factor generating a fluctuation in the response delay time of the second $O_2$ sensor.

Referring to FIGS. 10 and 11, a response delay time TDLYAV of the second $O_2$ sensor varies with a first feedback control period TFB. Therefore, the response delay time TDLYAV must be corrected in accordance with the period TFB of first feedback control-corrected quantity at the time of measurement.

A lean response delay time TRL elapses between the beginning of a decrease in the first feedback control-corrected quantity FAF and a lean inversion time of the second $RO_2$ signal in response to a rich inversion of the first detection signal $FO_2$ that is sent out from the first $O_2$ sensor. A rich response delay time TLR elapses between the beginning of an increase in the first feedback control-corrected quantity FAF and a rich inversion time of the second $RO_2$ signal in response to a lean inversion of the first detection signal $FO_2$. As illustrated in FIG. 14, when a value TDLY, at which it is determined that a catalyzer is deteriorated, is determined simply from an equation $TDLY=(TRL+TLR)\div 2$, the deterioration-determined value TDLY varies with the rich determination delay time DLR and the lean determination delay time DRL of the first feedback control-corrected quantity FAF. Such a variation results in a problem in that the deterioration-determined value TDLY forms a non-linear relationship with the first feedback control period TFB. The deterioration-determined value TDLY thereby fluctuates a great deal. This prevents the cleaning rate of the catalyzer from being measured with high precision.

In order to obviate or minimize the above-described inconveniences, the present invention provides a catalyst deterioration-determining device for an internal combustion engine having first and second exhaust sensors positioned in an exhaust path of the internal combustion engine upstream and downstream respectively of the catalyzer located in the exhaust path. The internal combustion engine also has a control means for effecting feedback control to match an air-fuel ratio with a desired value in accordance with first and second detection signals from first and second exhaust sensors, respectively. The catalyst deterioration-determining device comprising a determining section of the control means which obtains a deterioration-determined value from a calculation based on a rich determination delay time, a lean determination delay time, a lean response delay time and a rich response delay time when a deteriorated state of the catalyzer is determined. The lean response delay time and the rich response delay time elapse from the beginning of a decrease and an increase in the first feedback control-corrected quantity respectively to a lean inversion time and a rich inversion time of the second detection signal. The deterioration-determined value is obtained in response to rich and lean inversions of the first detection signal, and the rich and lean determination delay times elapse from a rich inversion time and a lean inversion time of the first detection signal, respectively to the beginning of the decrease and increase in the feedback control-corrected quantity. Therefore, the determining section performs the calculation in accordance with the deterioration-determined value to determine the deteriorated state of the catalyzer.

Pursuant to the above structure of the present invention, when a deteriorated state of a catalyzer is determined, the determining section provided in the control means obtains the deterioration-determined value from calculation based on: the lean response delay time and the rich response delay time, which respectively elapse from the beginning of a decrease and an increase in the first feedback control-corrected quantity to the lean inversion time and rich inversion time of the second detection signal. The deterioration-determined value is obtained in response to the rich and lean inversions of the first detection signal; and, the rich and lean determination delay times which respectively elapse from the rich inversion time and lean inversion time of the first detection signal to the beginning of the decrease and increase in the feedback control-corrected quantity. In accordance with the deterioration-determined value, calculation is made to determine the deteriorated state of the catalyzer.

As described above, determination is made after the deterioration-determined value is obtained from calculation based on the rich determination delay time and the lean determination delay time of the first feedback control-corrected quantity in addition to the lean response delay time and the rich response delay time of the second detection signal. This method can eliminate any influence on the determination of a deteriorated state of the catalyzer due to manufacturing non-uniformities or deterioration during use of the first exhaust sensor which is located in the exhaust path upstream from the catalyzer. As a result, the deterioration-determined value can be interrelated linearly with the period of the first feedback control-corrected quantity.

BRIEF DESCRIPTION OF THE DRAWINGS

FIG. 7 is a view showing a relationship between a first feedback control-corrected quantity and a deterioration-determined value;

FIGS. 8A and 8B are views respectively depicting an output waveform of the first $O_2$ sensor and a waveform of the first feedback control-corrected quantity, and FIG. 8C is a view depicting an output waveform of the second $O_2$ sensor;

FIGS. 15A-15F are views showing periods and waveforms of the first feedback control-corrected quantity and respective output waveforms of a first $O_2$ sensor and a second $O_2$ sensor; and, FIGS. 16A and 16B are views showing a relationship between the waveform of the first feedback control-corrected quantity and an air-fuel ratio.

DETAILED DESCRIPTION

FIGS. 1 through 13 show an embodiment of a catalyst deterioration-determining device according to the present invention.

Figure 2:
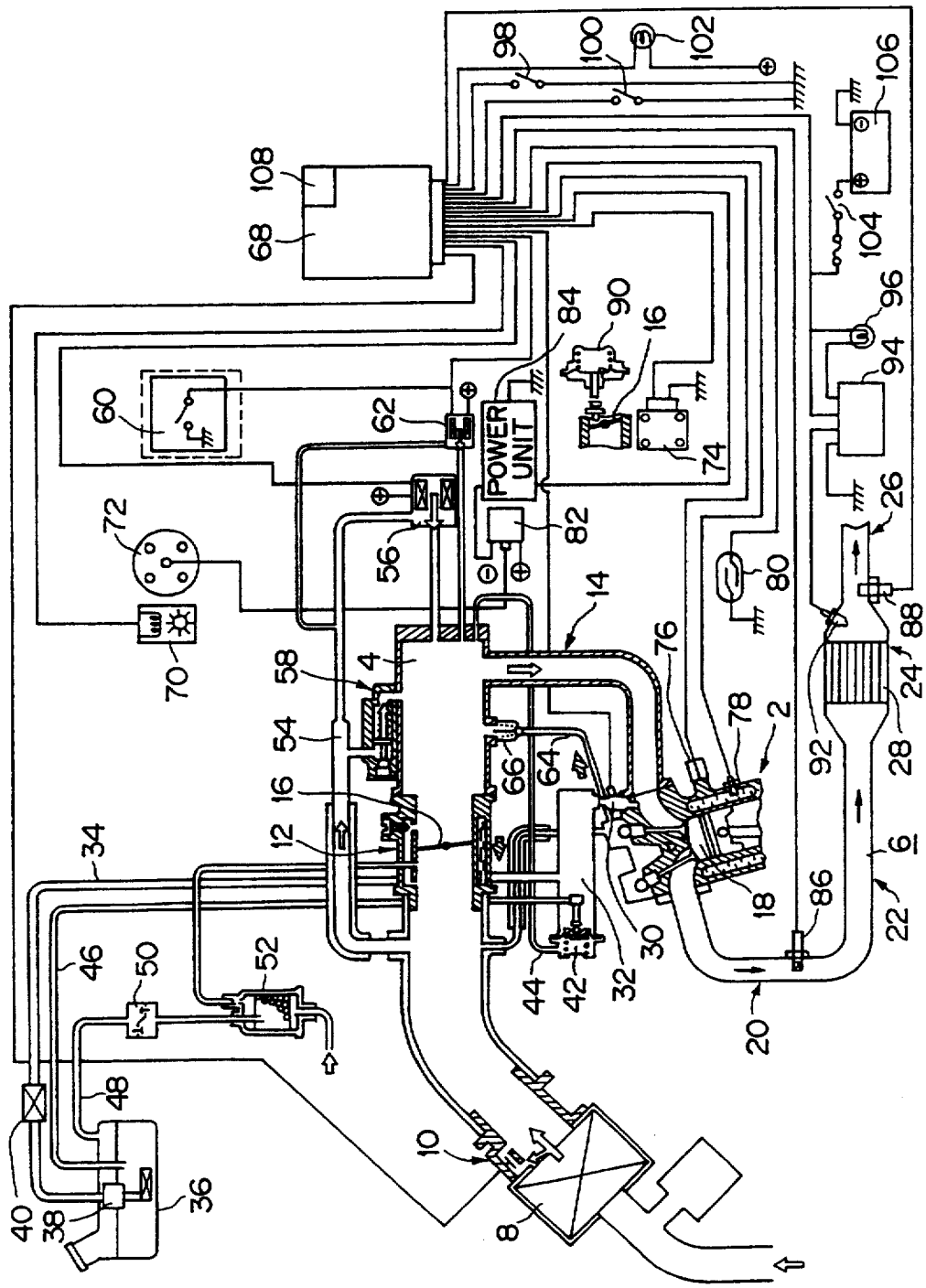
FIG. 2 is a schematic structural view of the catalyst deterioration-determining device.

In FIG. 2, there is shown an internal combustion engine 2, an intake path 4, and an exhaust path 6. The intake path 4 includes an air cleaner 8, an airflow meter 10, a throttle body 12, and an intake manifold 14, all of which are connected in series from an upstream side of the intake path 4. The intake path 4 within the throttle body 12 is provided with an intake throttle valve 16. The intake path 4 communicates with a combustion chamber 18 of the internal combustion engine 2.

The exhaust path 6, which communicates with the combustion chamber 18 includes an exhaust manifold 20, an upstream exhaust pipe 22, a catalytic converter 24, and a downstream exhaust pipe 26, all of which are connected in series from an upstream side of the exhaust path 6. The catalytic converter 24 is provided with a catalyzer 28.

The internal combustion engine 2 has a fuel injection valve 30 positioned adjacent and directed toward the combustion chamber 18. A fuel supply path 34 permits the fuel injection valve 30 to communicate with a fuel tank 36 via a fuel distribution path 32. Fuel within the fuel tank 36 is compressed and drawn away therefrom by a fuel pump 38, and is filtered by a fuel filter 40 so as to remove dust and dirt therefrom. The filtered fuel is fed into the fuel distribution path 32 through the fuel supply path 34, and is then dispensed to the fuel injection valve 30.

The fuel distribution path 32 has a fuel pressure-regulating section 42 disposed therein to regulate fuel pressure. The fuel pressure-regulating section 42 regulates fuel pressure to a given value through the aid of intake pressure which is introduced therein from a lead path 44 that communicates with the intake path 4. Excess fuel is returned to the fuel tank 36 through a return path 46.

The fuel tank 36 communicates with the intake path 4 within the throttle body 12 through a vapor fuel path 48. A two-way valve 50 and a canister 52 are interposed midway along the vapor fuel path 48. In addition, the throttle body 12 is defined with a by-pass pathway 54 which bypasses the intake throttle valve 16. An idle air quantity-regulating valve 56 is interposed midway along the by-pass pathway 54. Reference numerals 58, 60, 62, 64, and 66 respectively represent an air regulator, a power steering switch, a power steering air quantity-regulating valve, a blow-by gas path, and a PCV valve.

The airflow meter 10, the fuel injection valve 30, the idle air quantity-regulating valve 56, and the power steering air quantity-regulating valve 62 are linked to a control station 68 which serves as a control means. Further, the control station 68 is coupled separately to: a crank angle sensor 70; a distributor 72; an aperture sensor 74 for the intake throttle valve 16; a knock sensor 76; a water temperature sensor 78; and a vehicle velocity sensor 80. Reference numerals 82 and 84 respectively represent an ignition coil and a power unit for ignition.

Further, the internal combustion engine 2 has a first $O_2$ sensor 86 and a second $O_2$ sensor 88 disposed in the exhaust path 6, respectively upstream and downstream of the catalyzer 28. The first and second $O_2$ sensors 86 and 88 are exhaust sensors which detect an exhaust component value, i.e., oxygen concentration. The sensors 86 and 88 are linked to the control station 68.

Figure 3:
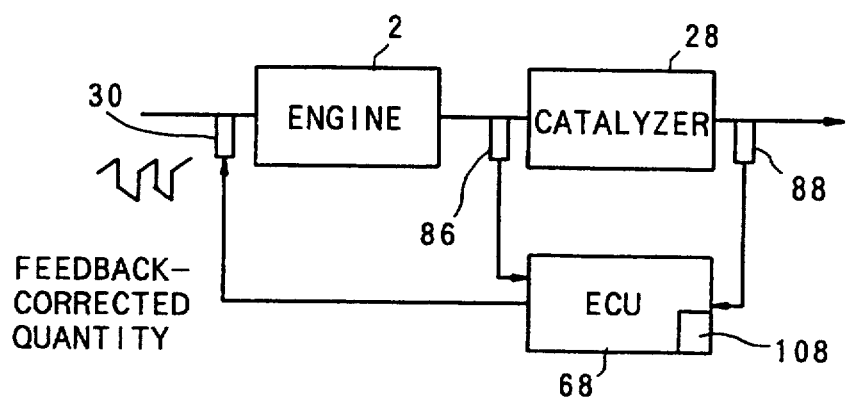
FIG. 3 is a block diagram of the catalyst deterioration-determining device.

As shown in FIG. 3, the control station 68 provides feedback control over operation of the fuel injection valve 30 such that an air-fuel ratio equals its desired value, in accordance with first and second detection signals from said first and second $O_2$ sensors 86 and 88, respectively. The exhaust cleanup efficiency of the catalyzer 28 is thereby improved, which lowers values of noxious exhaust components.

Reference numerals 90 92, 94, 96, 98, 100, 102, 104, and 106 respectively represent: a dash pot; a thermostat fuse; an alarm rely; a warning lamp; a diagnosis switch; a TS switch; a diagnosis lamp; a main switch; and a battery.

Figure 4A:
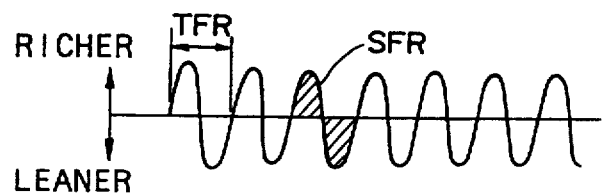
FIG. 4A is a view depicting an output waveform of a first $O_2$ sensor and FIGS. 4B and 4C are views depicting output waveforms of a second $O_2$ sensor respectively corresponding to a high-cleaning rate and a low-cleaning rate.
Figure 4B:
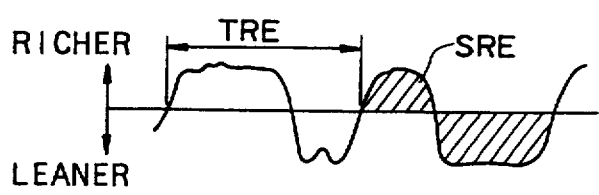
Figure 4C:
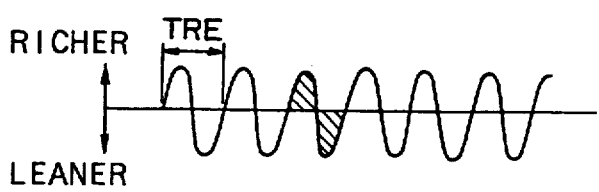

Referring now to FIGS. 4A-4C, the first and second detection signals from the first and second $O_2$ sensors 86 and 88 vary in accordance with periods TFR and TRE, respectively. Further, the period TFR of the first detection signal varies with the air-fuel ratio of the air/fuel mixture that is supplied to the internal combustion engine 2. Meanwhile, the period TRE of the second detection signal varies with the cleaning rate of the catalyzer 28. More specifically, when the cleaning rate is low because of deterioration of the catalyzer 28, the period TRE varies at shorter periods than when the cleaning rate is high.

Applicant's aforementioned copending application Ser. No. 08/102,090 is directed to a catalyst deterioration-determining device in which the deteriorated state of the catalyzer 28 is determined by calculating a deterioration-determined value on the basis of: a periodic ratio between the periods TFR and TRE of the first and second detection signals (i.e., the periodic ratio = TFR ÷ TRE); and, an area ratio between areas SFR and SRE (i.e., the area ratio = SRE ÷ SFR). The area SFR is defined by a trajectory of one period TFR of the first detection signal. The area SRE is defined by a trajectory of one period TRE of the second detection signal.

In this type of internal combustion engine 2, the control station 68 is provided with a determining section 108 in which calculation is made to determine the deteriorated state of a catalyzer 28. When the deteriorated state of the catalyzer 28 is determined, the determining section 108 obtains a deterioration-determined value TDLY from calculation based on: a lean response delay time TRL, and a rich response delay time TLR, which elapse from the beginning of a decrease and an increase in a first feedback control-corrected quantity FAF, respectively to a lean inversion time and a rich inversion time of the second detection signal in response to rich and lean inversions of the first detention signal; and, a rich determination delay time DLR, and a lean determination delay time DRL, which elapse from a rich inversion time and a lean inversion time of the first detection signal respectively to the beginning of the decrease and increase in the feedback control-corrected quantity FAF. In accordance with the deterioration-determined value TDLY, calculation is made to determine the deteriorated state of the catalyzer 28.

Figure 1:
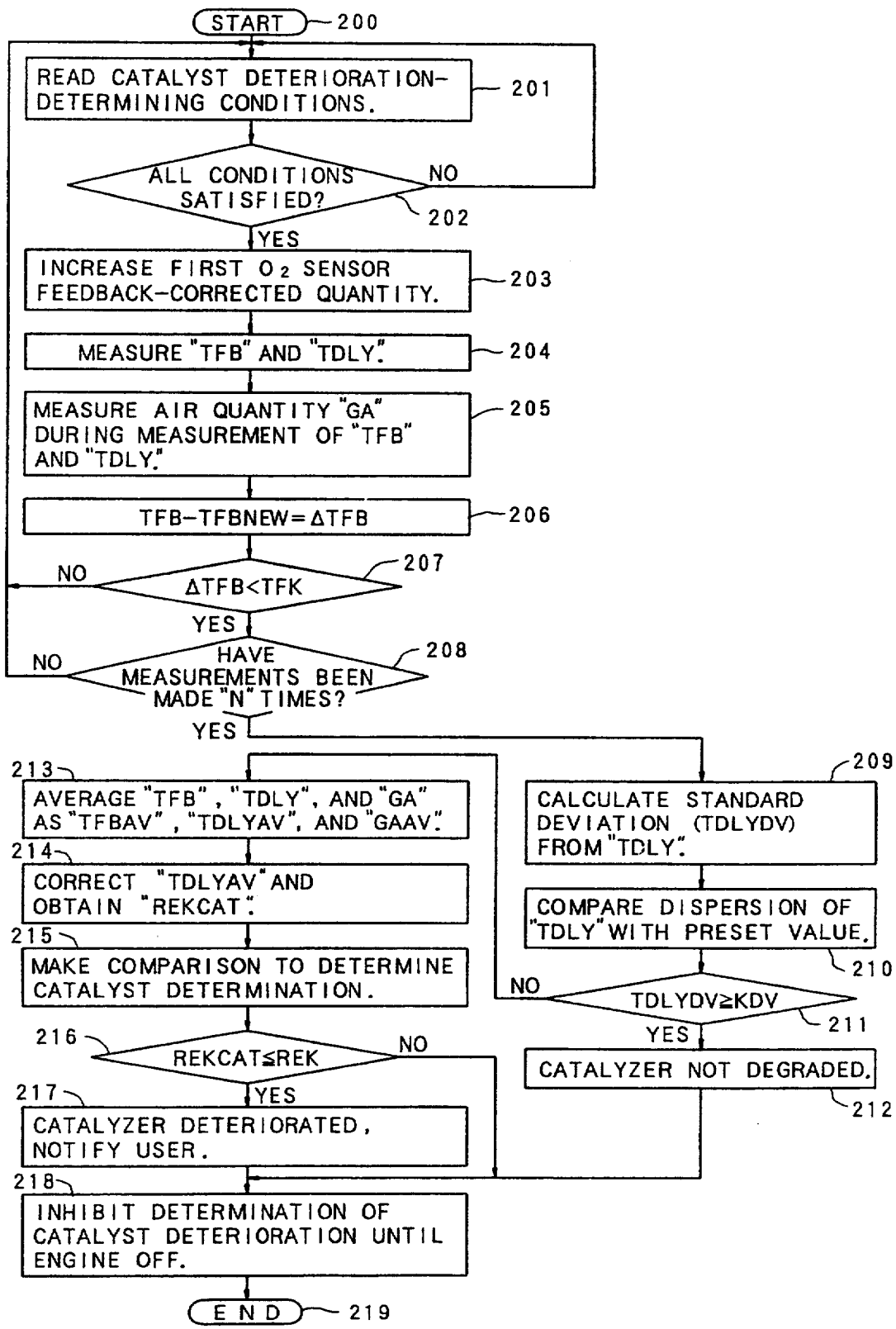
FIG. 1 is a flow chart showing an embodiment of the present invention in which determination is made by a catalyst deterioration-determining device for an internal combustion engine.

It will now be described with reference to FIG. 1 how determination is made by the catalyst deterioration-determining device.

When a determination routine begins after the internal combustion engine 2 is started at step 200, predetermined conditions for determining catalyst deterioration are read at step 201. It is determined at step 202 whether the conditions have been fulfilled.

Figure 5:
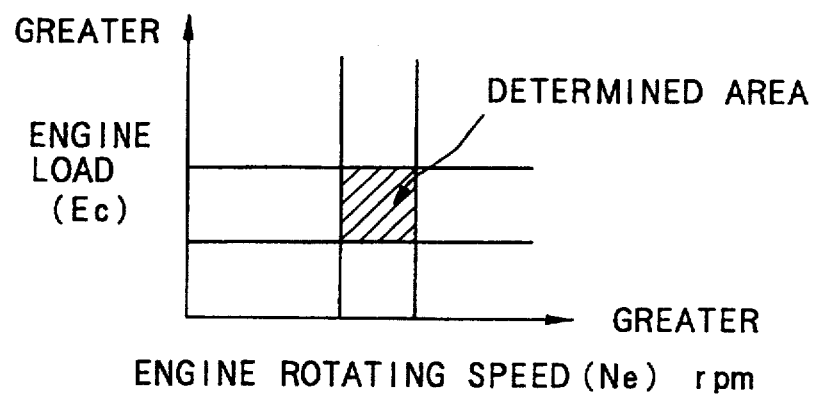
FIG. 5 is a descriptive illustration of a catalyst deterioration-determined area.

FIG. 5 shows the catalyst deterioration-determining conditions which include: data falls within a catalyst deterioration-determined area which is defined by an engine load, Ec, and an engine rotating speed, Ne; the warming-up of the internal combustion engine 2 has been completed; an intake air temperature is equal or greater than a set value (i.e., the intake air temperature $\geq$ the set value); first feedback control is being effected by means of the first $O_2$ sensor 86; and, a velocity per hour is constant (i.e., a variation in amount of the engine load Ec due to intake air quantity, throttle valve opening, fuel injection quantity, intake pressure, and the like does not exceed a set value). As described above, determination is made as to whether all of the above conditions have been satisfied.

When the result of step 202 is "NO" because any one of the conditions are not fulfilled, control is returned to step 201 at which time the catalyst deterioration-determining conditions are read again. When the answer to the determination in step 202 is "YES" because all of the conditions are satisfied, the first feedback control-corrected quantity FAF is increased at step 203 to a level at which catalyst deterioration can be determined.

Figure 6:
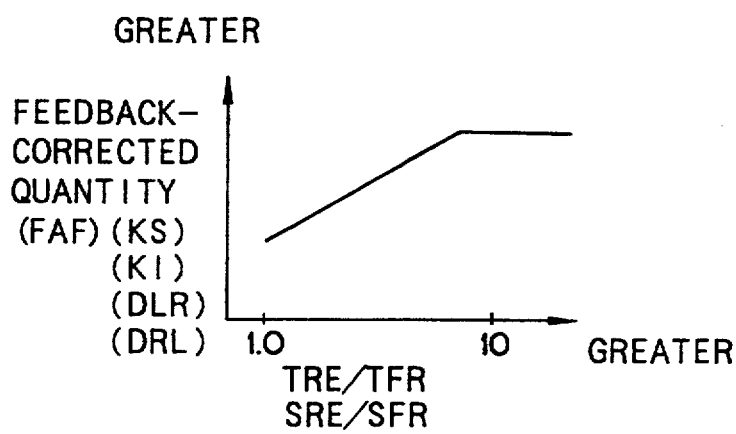
FIG. 6 is a view showing a relationship between a deteriorated state of a catalyzer and a first feedback corrected quantity.

As shown in FIG. 6, the increased FAF for the determination of catalyst deterioration is matched, for example, with a value corresponding to a deteriorated state of the catalyzer 28, or with a value that has been preset in the control station 68. This is done because, as shown in FIG. 7, an increase in the value of the first feedback control-corrected quantity FAF at the time of determining catalyst deterioration can decrease dispersion ($\Delta$TDLYAV) which will occur when a deterioration-determined value, TDLY, is measured. (TDLY will be described below.) The accuracy of determination is thereby improved.

Next, as illustrated in FIG. 8A–8C, the following is measured at step 204: a period, TFB, of the first feedback control-corrected quantity FAF; and, the deterioration-determined value TDLY (i.e., a response delay time of the $O_2$ sensor for the determination of catalyst deterioration). Further, an air quantity, GA, at the time of the measurements of TFB and TDLY is measured at step 205. A difference $\Delta$TFB between the periods (i.e., TFB−TFBNEW) is determined at step 206. In order to measure the deterioration-determined value TDLY when the period TFB is constant, $\Delta$TFB is compared with a $\Delta$TFB-determined value (TFK) to determine whether $\Delta$TFB is less than TFK at step 207.

Figure 9:
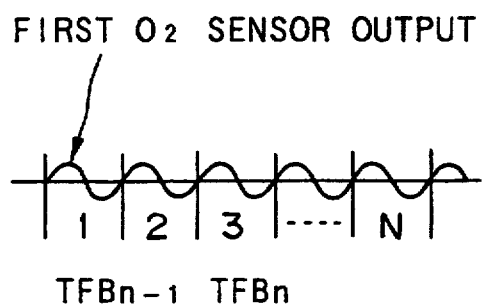
FIG. 9 is a view illustrating the output waveform of the first $O_2$ sensor.

FIG. 9 illustrates how the period TFB is determined. A first period TFB is taken as TFB1 (i.e., TFB=TFB1), and each subsequent period TFB is determined from an equation, TFB=(last TFB+TFBn)÷2. The $\Delta$TFB-determined value (TFK) has been preset in the control station 68. The deterioration-determined value TDLY is determined on the basis of: the lean response delay time TRL and the rich response delay time TLR of the second $O_2$ sensor; and, the rich determination. delay time DLR and the lean determination delay time DRL of the first $O_2$ sensor. In short, as shown in FIG. 8, TDLY is calculated from an equation, TDLY=(TLR+DLR+TRL+DRL)÷2.

When the answer to the determination in step 207 is "NO" because $\Delta$TFB is equal or greater than TFK ($\Delta$TFB−TFK), a measuring counter is cleared to zero "N" times. Control is then returned to step 201 at which time the catalyst deterioration-determining conditions are again read. When the answer to the determination in step 207 is "YES" because $\Delta$TFB is less than TFK ($\Delta$TFB$\leq$TFK), determination is made at step 208 as to whether measurements have been made and completed the requisite number of times (N).

When the answer to the determination in step 208 is "NO", control is returned to step 201 at which time the catalyst deterioration-determining conditions are again read. When the answer to the determination in step 208 is "YES" a standard deviation, TDLYDV, from the deterioration-determined value TDLY, which has been measured N times, is calculated at step 209. At step 210, a dispersion dependent upon the measurement of the deterioration-determined value TDLY is compared with a set value KDV which has been preset in the control station 68. It is determined at step 211 whether the standard deviation TDLYDV is equal or greater than the set value KDV.

When the answer to the determination in step 211 is "YES" because the standard deviation TDLYDV fluctuates in excess of the set value KDV (TDLYDV$\geq$KDV), the catalyzer 28 has a large $O_2$ storage capacity without being deteriorated. Therefore, it is determined at step 212 that the catalyzer 28 is not degraded. Accordingly, further determination of the catalyst deteriorated state is inhibited at step 218 until the internal combustion engine 2 is turned off. Then, the routine ends with step 219.

When the answer to the determination in step 211 is "NO" because the standard deviation TDLYDV converges in a range less than the set value KDV (TDLYDV<KDV), calculations are performed in order to determine individual averages of the periods, TFB's, the deterioration-determined values, TDLY's, and the air quantities, GA's, each of which has been measured N times. Then, the determined averages of TFB, TDLY, and GA are taken as TFBAV, TDLYAV, and GAAV respectively at step 213.

Figure 10:
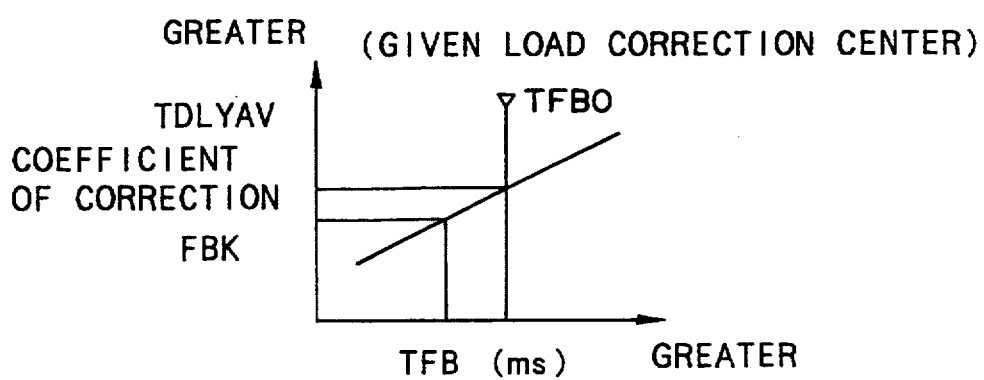
FIG. 10 is a view showing a relationship between a period of the first feedback control-corrected quantity and a coefficient of correction.
Figure 11:
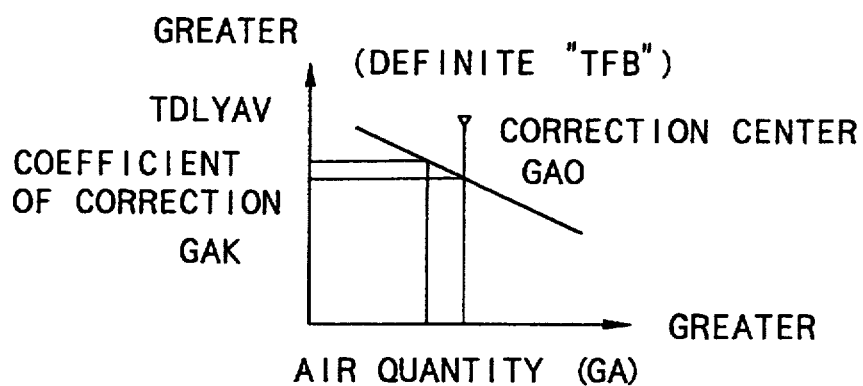
FIG. 11 is a view illustrating a relationship between an air quantity and a coefficient of correction.
Figure 13:
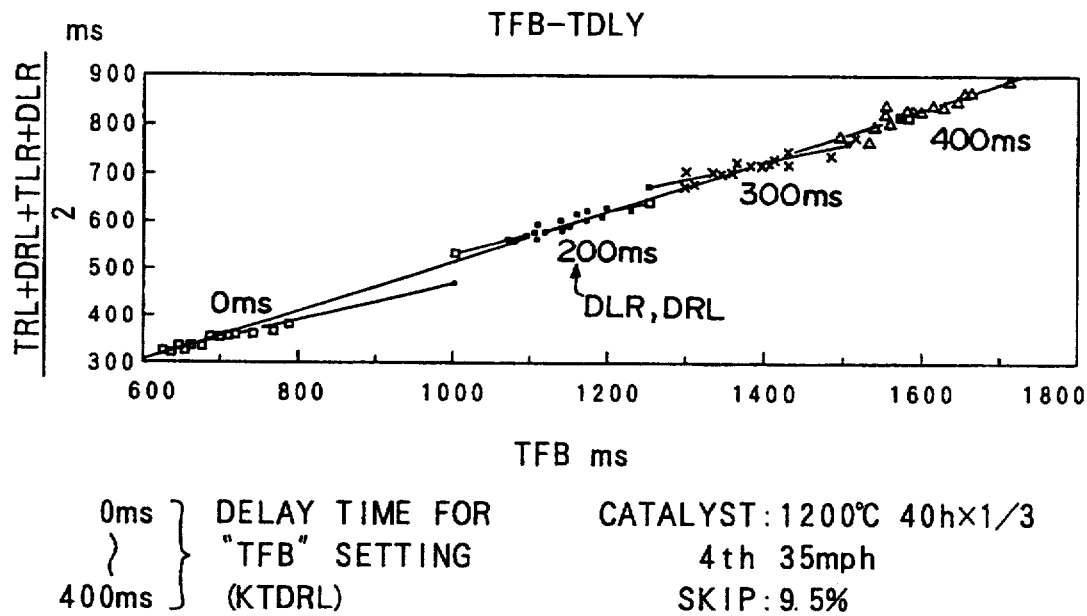
FIG. 13 is a view showing a relationship between the period of the first feedback control-corrected quantity and a deterioration-determined value.

As illustrated in FIGS. 10, 11, and 13, the deterioration-determined value TDLY varies linearly with the period TFB and the air quantity GA. The average TDLYAV of TDLY is corrected by an equation, REKCAT=TDLYDV+(TFBO−TFB)×FBK+(GAO−GA)×GAK. Then, a deterioration-determining comparison value, REKCAT, is obtained in step 214.

Figure 12:
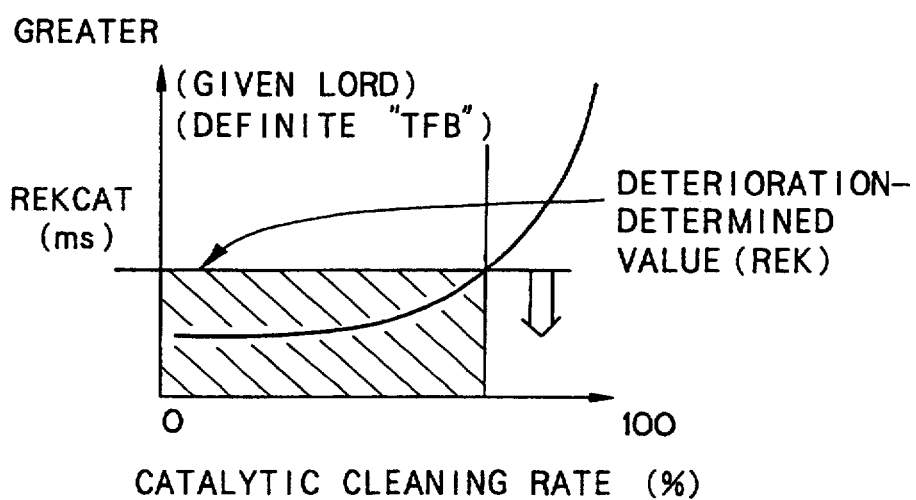
FIG. 12 is a view illustrating a relationship between a catalytic cleaning rate and a deterioration-determining comparison value.

As shown in FIG. 12, the deteriorated state of the catalyzer 28 is determined with reference to the deterioration-determining comparison value REKCAT for a given load and a definite period TFB. The determination is carried out at step 215 in accordance with comparison between the comparison value REKCAT and a set value REK that has been preset in the control station 68. It is then determined at step 216 whether the comparison value REKCAT is equal or less than the set value REK.

When the answer to the determination in step 216 is "NO" because the deterioration-determining comparison value REKCAT exceeds the set value REK (i.e., REKCAT>REK), it is found that the catalyzer 28 is not deteriorated. Accordingly, further determination of the catalyst deteriorated state is inhibited at step 218 until the internal combustion engine 2 is turned off. Then, the routine ends with step 219.

When the answer to the determination in step 216 is "YES" because the comparison value REKCAT is equal or less than the set value REK (i.e., REKCAT-≦REK), it is determined in step 217 that the catalyzer 28 has been degraded and a warning means such as a warning lamp (not shown) is actuated to issue a warning. Future determination of the catalyst deteriorated state is inhibited until the internal combustion engine 2 is stopped step 218. Then, the routine ends with step 219.

As described above, when determination is made as to whether the catalyzer 28 is deteriorated, the determining section 108, which is provided in the control station 68, determines a deteriorated state of the catalyzer 28 in accordance with the deterioration-determined value TDLY which is obtained from the calculation based on: the lean response delay time TRL and the rich response delay time TLR of the second detection signal; and, the rich determination delay time DLR and the lean determination delay time DRL of the first feedback control-corrected quantity FAF. This arrangement can eliminate any influence on the determination of the deteriorated state of the catalyzer 28 due to manufacturing non-uniformities or deterioration during use of the first $O_2$ sensor 86 which is located in the exhaust path 6 on an upstream side of the catalyzer 28. As a result, the deterioration-determined value TDLY can be interrelated linearly with the period TFB of the first feedback control-corrected quantity FAF, as shown in FIG. 13.

With reference to FIGS. 8A–8C, the time from "a" to "d" corresponds to a delay time between a rich inversion of the first $O_2$ sensor 86 and a rich inversion of the second 0" sensor 88. The time from "c" to "e" corresponds to a delay time between a lean inversion of the first $O_2$ sensor 86 and a lean inversion of the second $O_2$ sensor 88. The rich inversion time "a" and the lean inversion time 37 c" of the first $O_2$ sensor 86 vary with a change in an air-fuel ratio according to an increase and decrease in the first feedback control-corrected quantity FAF. As a result, the rich inversion delay time ("a" through "d"), which elapses between the respective rich inversions of the first $O_2$ sensor 86 and the second $O_2$ sensor 88, and the lean inversion delay time ("c" through "e"), which elapses between the respective lean inversions of the first $O_2$ sensor 86 and the second $O_2$ sensor 88, involve changes in output characteristics of the first $O_2$ sensor 86 due to manufacturing non-uniformities or deterioration during use, and in particular, a change in its response time. This causes an inconvenience in that variations in the output characteristics of the first $O_2$ sensor 86 are introduced into the time in which the deterioration-determined value TDLY is measured, thereby resulting in a fluctuation in the deterioration-determined value TDLY.

In order to eliminate the above problem, the deterioration-determined value TDLY is determined by: a lean response delay time, TRL, which elapses from the beginning "b" of a decrease in the first feedback control-corrected quantity FAF in response to the rich inversion of the first detection signal, which is sent out from the first $O_2$ sensor 86, to a lean inversion time "e" of the second detection signal, which is sent out from the second $O_2$ sensor 86; and, a rich response delay time, TLR, which elapses from the beginning "f" of an increase in the first feedback control-corrected quantity FAF in response to the lean inversion of the first detection signal to a rich inversion time "g" of the second detection signal. The variations in the output characteristics of the first $O_2$ sensor 86 are thereby prevented from being brought into the time in which the deterioration-determined value TDLY is measured.

Figure 14:
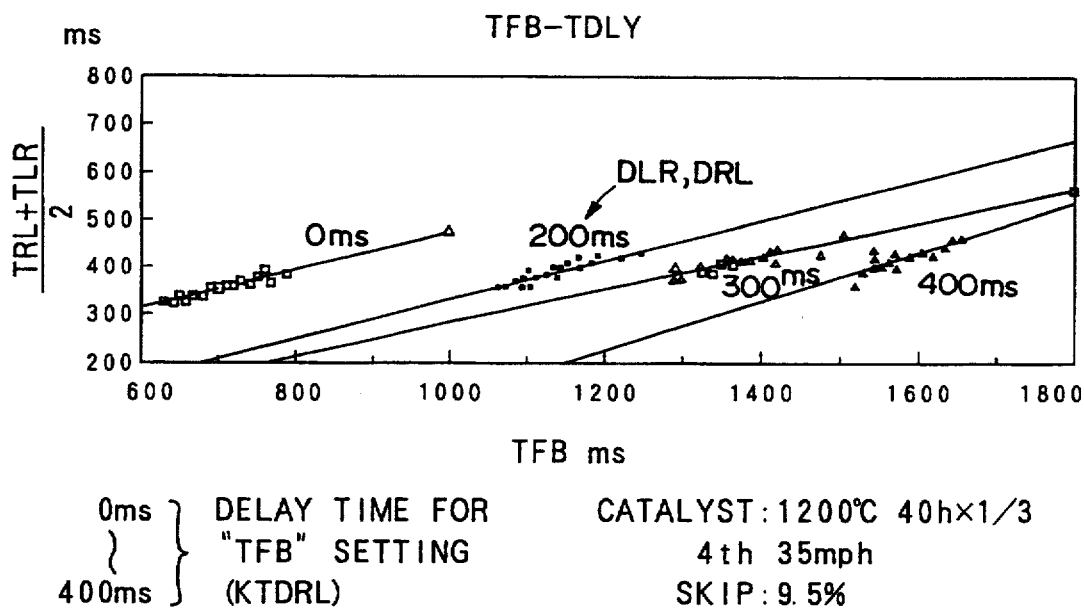
FIG. 14 is a view illustrating a relationship between a period of a first feedback control-corrected quantity and a deterioration-determined value according to the prior art.

However, an inconvenience will occur when the deterioration-determined value TDLY is determined only on the basis of the lean response delay time TRL and the rich response delay time TLR of the second $O_2$ sensor 88. That is, as illustrated in FIG. 14, the deterioration-determined value TDLY varies in accordance with: a rich determination delay time, DLR, which elapses between the rich inversion time "a" of the first detection signal and the beginning "b" of the decrease in the first feedback control-corrected quantity FAF; and, a lean determination delay time, DRL, which elapses between the lean inversion time "c" of the first detection signal and the beginning "f" of the increase in the first feedback control-corrected quantity FAF.

In order to obviate the above problem, the deterioration-determined value TDLY is calculated on the basis of: the lean response delay time TRL and the rich response delay time TLR, which respectively elapse from the beginning "b" and "f" of the decrease and increase in the first feedback control-corrected quantity FAF to the lean inversion time "e" and the rich inversion time "g" of the second detection signal in response to the rich and lean inversions of the first detection signal; and, the rich determination delay time DLR and the lean determination delay time DRL, which respectively elapse from the rich inversion time "a" and the lean inversion time "c" of the first detection signal to the beginning "b" and "f" of the decrease and increase in the first feedback control-corrected quantity FAF. This arrangement can eliminate any influence on the determination of a deteriorated state of the catalyzer 28 due to manufacturing non-uniformities or deterioration during use of the first $O_2$ sensor 86 which is located in the exhaust path 6 on the upstream side of the catalyzer 28. As a result, the deterioration-determined value TDLY can be interrelated linearly with the period TFB of the first feedback control-corrected quantity FAF.

This benefit prevents a variation in accuracy (needed for determining a deteriorated state of the catalyzer 28) from increasing, thereby allowing improved accuracy for determining the deterioration of the catalyzer. Therefore, the inconvenience that results when the catalyzer 28 is determined to be abnormal regardless of the normal functioning of the catalyzer 28 can be avoided. This increases reliability. Further, the discharge of a large quantity of uncleaned exhaust into the air can be avoided as well.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A catalyst deterioration-determining device for an internal combustion engine having first and second exhaust sensors positioned in an exhaust path of said internal combustion engine respectively on an upstream side and a downstream side of a catalyzer located in said exhaust path, said internal combustion engine further including a control means for effecting feedback control for matching an air-fuel ratio with a desired value in accordance with first and second detection signals respectively from said first and second exhaust sensors, said catalyst deterioration-determining device comprising: said control means including a determining means for determining a deterioration-determined value from a calculation based on a rich determination delay time, a lean determination delay time, a lean response delay time, and a rich response delay time when a deteriorated state of said catalyzer is determined, said lean response delay time and said rich response delay time respectively elapsing from the beginning of a decrease and an increase in a first feedback control-corrected quantity to a lean inversion time and a rich inversion time of said second detection signal in response to rich and lean inversions of said first detection signal, said rich determination delay time and said lean determination delay time respectively elapsing from a rich inversion time and a lean inversion time of said first detection signal to the beginning of said decrease and increase in said feedback control-corrected quantity, thereby causing said determining means to perform said calculation in accordance with said deterioration-determined value so as to determine said deteriorated state of said catalyzer.

2. A catalyst deterioration-determining apparatus for an internal combustion engine having an exhaust path, a catalyzer disposed in line with the exhaust path, a first exhaust sensor disposed in line with the exhaust path upstream from the catalyzer for generating a first detection signal; a second exhaust sensor disposed in line with the exhaust path downstream from the catalyzer for generating a second detection signal, and a feedback controller for driving an air-fuel ratio to a set value by controlling the operation of a fuel injector valve via a feedback control-corrected quantity signal generated in accordance with the first and second detection signals, the apparatus comprising:

a determining section associated with the feedback controller for determining a deterioration-determined value representing a deteriorated state of the catalyzer, means for determining a lean response delay time which elapses from a decrease in the feedback control-corrected quantity signal to a lean inversion time of the second detection signal in response to a rich inversion of the first detection signal;

means for determining a rich response delay time elapsing from an increase in the feedback control-corrected quantity signal to a rich inversion time of the second detection signal in response to a lean inversion of the first detection signal;

means for determining a rich determination delay time elapsing from a rich inversion time of the first detection signal to a decrease in the feedback control-corrected quantity signal;

means for determining a lean determination delay time elapsing from a lean inversion time of the first detection signal to an increase in the feedback control-corrected quantity signal; and said deterioration-determining value representing one-half of a sum of said lean response delay time, said rich response delay time, said rich determination delay time, and said lean inversion delay time.

* * * * *